Patented Aug. 14, 1945

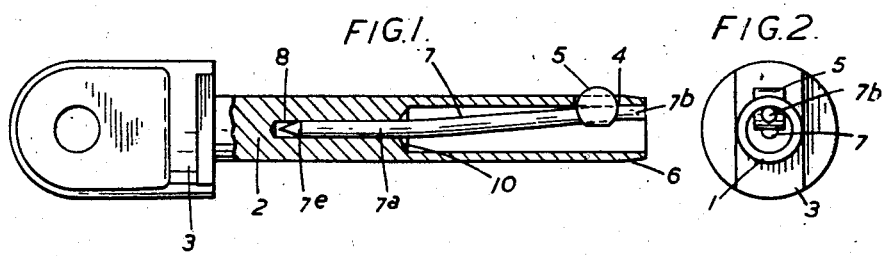
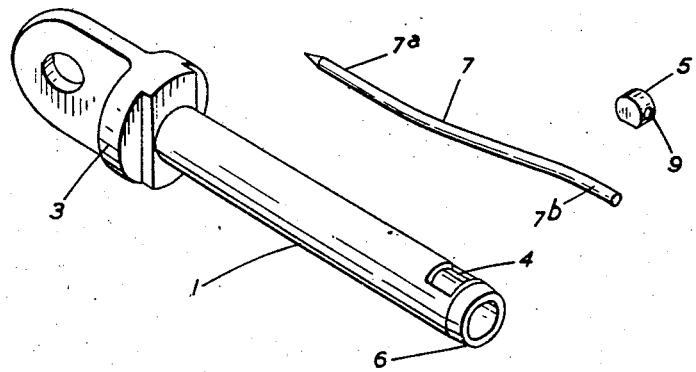
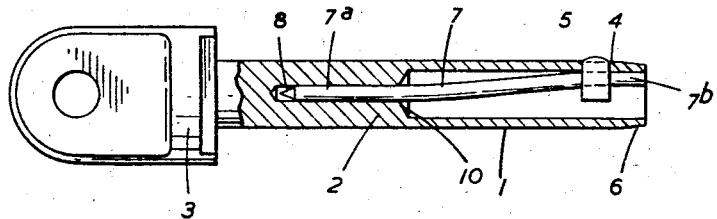
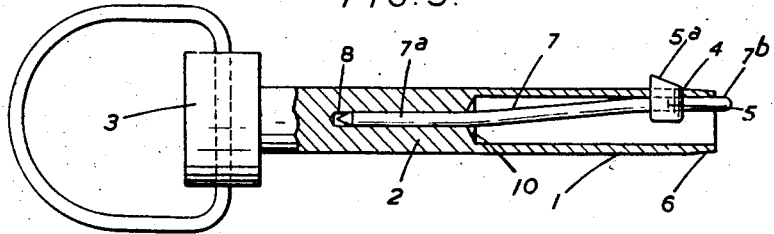

2,382,166

UNITED STATES PATENT OFFICE 2,382,166

HINGE PIN, RETAINER PIN, AND THE LIKE PROVIDED WITH SELF-LOCKING MEANS

James Martin, Higher Denham, near Uxbridge, England

Application April 14, 1944, Serial No. 531,108
In Great Britain September 7, 1943

4 Claims. (Cl. 85—5)

This invention relates to hinge pins, retainer pins and the like provided with self-locking means which function automatically to provide an abutment normally preventing removal or axial displacement of the pin or the like when it has been inserted the predetermined requisite extent into elements being coupled by the pin or the like. The invention is particularly useful where it is required to obtain a quick-release locking action, e. g. as with lynch pins, pins for connecting magazine to gun mountings, hinging together control elements in aircraft and for multitudinous other purposes. The chief object of the invention is to provide a locking device which is cheap and simple to manufacture in large quantities and easily assembled with hollow pins, studs, bolts and the like. Another object of this invention is to provide a resilient self-locking device entailing the minimum number of parts, and a further object of the invention is to avoid the necessity of extraneous fitments to the pin or the like for locating and spring loading an abutment member which is urged automatically to the "stop" or locking position relatively to the pin or the like.

According to this invention self-locking means is intended for use with hollow, bored or slotted pins or the like and comprises an abutment adapted to be projected radially through the stem, shank or the like of the pin and supported by a length of resilient wire or rod adapted to be secured in the pin or the like in a direction substantially perpendicular to the radial direction of movement of said abutment relatively to the pin.

In the preferred form of the present invention a hinge pin, retainer pin or the like provided with self-locking means comprises a tubular pin with a hole or slot in its periphery, a plunger slidable through such hole or slot, and a length of resilient wire or rod engaged at one end as a push fit in a bore formed in one end of the pin in prolongation of the hollow of the pin and fitted in the said plunger at its other end, said wire or rod urging the plunger beyond the periphery of the pin and resiliently opposing inward radial movement of the plunger, the outer end of the plunger being radiused or bevelled to permit insertion of the pin in the appropriate elements to be coupled by the pin.

In order that the invention may be clearly understood and readily carried into effect, drawing is appended hereto illustrating embodiments thereof, and wherein, Fig. 1 is a longitudinal sectional view of a plain cylindrical pin with one form of locking device fitted therein.

Fig. 2 is an end elevation of Fig. 1 looking at the open end of the pin.

Fig. 3 is a perspective view showing the separated elements of the pin with self-locking means, wherein it will be seen that the complete device consists of a very few simple elements, and Figs. 4 and 5 show alternative types of pins and plungers.

Referring to the drawing the pin 1 can have any suitable external configuration and can be used for multitudinous purposes where it is required to couple together elements apertured to receive the pin, the pin being hollow for the predominating portion of its length and closed by a solid end portion 2 which normally would be formed with a head 3. In the examples shown the pin is a parallel cylindrical pin adapted to act as a hinge pin, fastening member or the like and near its open end it is formed with an aperture 4 in its periphery to receive a plunger or detent engaging piece 5, the open end preferably having a bevel or taper 6 to facilitate insertion of the pin in the appropriate hole, and if desired this taper can extend to the aperture 4.

The plunger 5 is shaped to fit the aperture with the minimum easy working clearance so that it is free to rise and fall in such aperture and it is preferably shaped so that it will pass completely through the aperture. The plunger is held in its normal position slightly projecting beyond the periphery of the pin 1 by resilient means which is inter-connected with the plunger and with the pin, such resilient means being of an extremely simple and easily produced form and not requiring fastening means additional to such inter-connection to retain it in operative position. For this purpose said resilient means comprises a short length of suitable gauge steel or other suitable resilient wire or thin rod 7 one end of which is a push fit in the pin 1 so that it extends along the interior of the pin preferably with its axis in a plane radial in relation to the pin.

The wire or rod 7 is secured against axial displacement relatively to the pin 1 once it is located in the pin and plunger by reason of it having imparted to it a slight bend between its ends leaving one limb 7a parallel with the axis of the pin for a push-fit engagement in a narrow bore 8 in the solid part 2 of the pin in coaxial prolongation with the hollow of the pin, and a limb 7b which is passed at its free end as a push fit through an eye 9 in the plunger 5, its extremity 7b which engages in and projects through the plunger 5 preferably being parallel with the limb 7a engaged in the bore 8, so that in its preferred form the member 7 is slightly bent at two positions between its ends to provide two parallel end parts joined by a relatively slightly inclined median part.

The part 7a of the member 7 which fits in the bore 8 is preferably formed with a conical point 7e to facilitate insertion into such bore, and for the same reason it is preferred to flare the open end of the bore 8 by a conical end wall 10 at the inner end of the hollow of the pin.

The members 7 can be produced easily in large quantities by feeding the wire through a cutter having dies which impart the beforesaid slight double bend to the members 7 as they are sheared from the length of wire.

The plunger 5 is preferably shaped to form a cam-like part projecting from the periphery of the pin I so that the pin can be pushed home without the plunger preventing insertion of the pin in the appropriate hole, the wire or rod member 7 urging the plunger to the protruding position immediately the plunger has passed through the members being connected by the pin. In this connection the plunger may be a D-shaped or cylindrical body as shown in Figs. 1 and 3 with the eye 9 located substantially transverse relatively to the axis of the plunger, or it may be a cylindrical member with its axis radial to the axis of the pin as shown in Fig. 4 in which event the top of the plunger can be part spherical as shown. Alternatively the plunger can be a ball, or a cubical or cylindrical member with a tapered top, the latter form of plunger being shown in Fig. 5 in which the inclined or tapered top 5a normally slopes up from the periphery of the pin away from the open end of the pin thus providing a positive stop opposing withdrawal of the pin as distinct from the plungers with radiused tops which yield to sufficient traction on the pin when the pin is to be removed. In Fig. 5 the end 7b of the wire 7 extends slightly beyond the end of the pin I to form a finger piece to retract the plunger 5.

The part of the wire or thin rod 7 which engages in the plunger may be flattened by pinching it at the appropriate point or it may have flat sides throughout its length, e. g. square or triangular section. If it is desired to keep the pin I as solid as possible throughout its length, it may be slotted diametrically instead of hollowed as previously described, the slot taking the member I, and the plunger 5 being located in a diametrical hole intersected by the slot.

Should it be required to have more than one plunger 5 two or more apertures 4 can be formed in the pin and a corresponding number of plungers fitted to the member I, or if it is desired to have a plunger at each end of a pin, the pin can be hollow throughout its length excepting for a central solid part bored axially to take the ends of two lengths of wire or narrow gauge rod bent to form two members 7 extending towards both ends of the pin and fitted at their ends with plungers 5. Also instead of boring the solid part of the pin as at 8 the inner end of the wire member 7 can be curled or formed into a helix to wedge it in the hollow of the pin. The plunger 5 need not be solid as it may be a sheet metal stamping closed at one end, and it can be slotted instead of bored transversely to receive the member 7.

It will be understood that in the following claims that "pin" contemplates pins of widely varying diameters, bolts and the like.

I claim:

1. In a self-locking connecting device, the combination of a pin having at least one hollow section open at one end and one solid section, a bore extending from the hollow section into the solid section and co-axial with the solid section, a separate resilient rod having one end fitting tightly into said bore and having the other end free to be flexed within the hollow section of said pin, an aperture in the wall of the hollow section of said pin, a plunger adapted to pass freely through said aperture, said plunger being mounted on the free end of said resilient rod.

2. In a self-locking connecting device, the combination of a pin having at least one hollow section open at one end and one solid section, a bore extending from the hollow section into the solid section and co-axial with the solid section, a separate resilient rod having one end fitting tightly into said bore and having the other end free to be flexed within the hollow section of said pin, an aperture in the wall of the hollow section of said pin, a plunger adapted to pass freely through said aperture, said plunger being mounted on the free end of said resilient rod, said rod normally maintaining said plunger in a position in which it projects through said aperture.

3. A self-locking device as recited in claim 1 in which the resilient rod is bent from the bore toward the wall of said hollow section.

4. A self-locking device as recited in claim 1 in which the plunger is slidably mounted on the free end of said resilient rod.

JAMES MARTIN.